United States Patent
Furuhashi

(10) Patent No.: US 9,712,760 B2
(45) Date of Patent: Jul. 18, 2017

(54) IMAGING APPARATUS, COMPOSITION ASSISTING APPARATUS, COMPOSITION ASSISTING METHOD, AND NON-TRANSITORY STORAGE MEDIUM STORING COMPOSITION ASSISTING PROGRAM

(71) Applicant: OLYMPUS CORPORATION, Shibuya-ku, Tokyo (JP)

(72) Inventor: Yukihito Furuhashi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 15 days.

(21) Appl. No.: 14/857,732

(22) Filed: Sep. 17, 2015

(65) Prior Publication Data
US 2016/0006945 A1 Jan. 7, 2016

Related U.S. Application Data

(63) Continuation of application No. PCT/JP2013/076401, filed on Sep. 27, 2013.

(30) Foreign Application Priority Data

Mar. 27, 2013 (JP) ................ 2013-067081

(51) Int. Cl.
*H04N 5/262* (2006.01)
*H04N 5/232* (2006.01)
(Continued)

(52) U.S. Cl.
CPC ....... *H04N 5/262* (2013.01); *G06F 17/30247* (2013.01); *H04N 5/23216* (2013.01);
(Continued)

(58) Field of Classification Search
CPC .... H04N 5/262; H04N 5/232; H04N 5/23216; H04N 5/23222; H04N 5/23293
See application file for complete search history.

(56) References Cited

U.S. PATENT DOCUMENTS 6,301,440 B1 * 10/2001 Bolle ............... G03B 13/00
   348/229.1
2001/0048815 A1 * 12/2001 Nakajima ............ G03B 17/24
   396/310
(Continued)

FOREIGN PATENT DOCUMENTS

JP   2007174548 A   7/2007
JP   2007235508 A   9/2007
(Continued)

OTHER PUBLICATIONS

International Preliminary Report on Patentability (IPRP) including Written Opinion (in English) dated Oct. 8, 2015, issued in parent International Application No. PCT/JP2013/076401.
(Continued)

*Primary Examiner* — Abdelaaziz Tissire
(74) *Attorney, Agent, or Firm* — Holtz, Holtz & Volek PC

(57) ABSTRACT

An imaging apparatus includes an object database, a composition database, an imaging unit, a determination unit, a search unit, a priority setting unit, and a display. The determination unit extracts an image feature amount from a photographed image data, and determines a kind of an object of the photographed image data, based on data stored in the object database. The search unit detects composition assisting information corresponding to the photographed image data from the composition database, based on the kind of the object and data stored in the composition database. The priority setting unit extracts characteristic information and determines presentation priority based on characteristic
(Continued)

information differences. The display displays the composition assisting information based on the priority.

19 Claims, 4 Drawing Sheets

(51) Int. Cl.
G06F 17/30 (2006.01)
H04N 101/00 (2006.01)

(52) U.S. Cl.
CPC ..... H04N 5/23222 (2013.01); H04N 5/23293 (2013.01); *H04N 2101/00* (2013.01)

(56) References Cited

U.S. PATENT DOCUMENTS

| | | | | |
|---|---|---|---|---|
| 2005/0007468 | A1* | 1/2005 | Stavely | H04N 5/23293 348/239 |
| 2005/0276596 | A1* | 12/2005 | Chan | H04N 5/23293 396/296 |
| 2007/0065137 | A1* | 3/2007 | Hara | G03B 17/18 396/291 |
| 2009/0169191 | A1* | 7/2009 | Chien | G03B 7/097 396/48 |
| 2009/0278958 | A1* | 11/2009 | Bregman-Amitai | H04N 5/23219 348/231.99 |
| 2010/0110266 | A1* | 5/2010 | Lee | H04N 5/23293 348/333.02 |
| 2010/0231741 | A1* | 9/2010 | Suzuki | G06K 9/00255 348/222.1 |
| 2010/0329552 | A1* | 12/2010 | Yim | H04N 1/00408 382/165 |
| 2011/0314049 | A1* | 12/2011 | Poirier | G06F 17/30241 707/769 |

FOREIGN PATENT DOCUMENTS

| | | |
|---|---|---|
| JP | 2009033544 A | 2/2009 |
| JP | 2010161547 A | 7/2010 |
| JP | 2011223599 A | 11/2011 |
| JP | 2012253669 A | 12/2012 |

OTHER PUBLICATIONS

Japanese Office Action (and English translation thereof) dated Aug. 2, 2016, issued in counterpart Japanese Application No. 2013-067081.
International Search Report (ISR) dated Oct. 29, 2013 issued in International Application No. PCT/JP2013/076401.

* cited by examiner

IMAGING APPARATUS, COMPOSITION ASSISTING APPARATUS, COMPOSITION ASSISTING METHOD, AND NON-TRANSITORY STORAGE MEDIUM STORING COMPOSITION ASSISTING PROGRAM

CROSS-REFERENCE TO RELATED APPLICATIONS

This application is a Continuation Application Of PCT Application No. PCT/JP2013/076401, filed Sep. 27, 2013 and based upon and claiming the benefit of priority from the prior Japanese Patent Application No. 2013-067081, filed Mar. 27, 2013, the entire contents of both of which are incorporated herein by reference.

BACKGROUND OF THE INVENTION

1. Field of the Invention

The present invention relates to an imaging apparatus which assists obtaining a photographic composition in accordance with an object to be photographed, a composition assisting apparatus, a composition assisting method, and a non-transitory storage medium storing a composition assisting program.

2. Description of the Related Art

An imaging apparatus having a user assisting function at the time of photography is known in the art. For example, Jpn. Pat. Appln. KOKAI Publication No. 2007-235508 discloses an imaging apparatus which automatically determines photographic conditions, including a shutter speed, an aperture value, ISO sensitivity, a focal position, and the use of flash, in accordance with the information acquired from a server. Jpn. Pat. Appln. KOKAI Publication No. 2011-223599 discloses an imaging apparatus which displays photographic guides in accordance with an object of interest.

According to a first aspect of the invention, an imaging apparatus comprises:

an object database storing data in which an image feature amount extracted from image data is associated with a kind of an object corresponding to the image feature amount, for each objects;

a composition database storing data in which the kind of the object and composition assisting information corresponding to the kind of the object are associated with each other;

an imaging unit which acquires photographed image data by photography;

a determination unit which extracts an image feature amount from the photographed image data, and which determines the kind of the object of the photographed image data, based on the data stored in the object database;

a search unit which detects composition assisting information corresponding to the photographed image data from the composition database, based on the kind of the object determined by the determination unit and the data stored in the composition database;

a priority setting unit which extracts characteristic information regarding each image from the photographed image data and sample image data related to the composition assisting information detected by the search unit, and which determines presentation priority in which the composition assisting information detected by the search unit are presented to a user, based on characteristic information differences; and a display which displays the composition assisting information based on the priority determined by the priority setting unit.

According to a second aspect of the invention, a composition assisting apparatus comprises:

an object database storing data in which an image feature amount extracted from image data is associated with a kind of an object corresponding to the image feature amount, for each of objects;

a composition database storing data in which the kind of the object and composition assisting information corresponding to the kind of the object are associated with each other;

a photographed image data acquiring unit which acquires photographed image data by photography;

a determination unit which extracts an image feature amount from the photographed image data, and which determines the kind of the object of the photographed image data, based on the data stored in the object database;

a search unit which detects composition assisting information corresponding to the photographed image data from the composition database, based on the kind of the object determined by the determination unit and the data stored in the composition database;

a priority setting unit which extracts characteristic information regarding each image from the photographed image data and sample image data related to the composition assisting information detected by the search unit, and which determines presentation priority in which the composition assisting information detected by the search unit are presented to a user, based on characteristic information differences; and a display which displays the composition assisting information based on the priority determined by the priority setting unit.

According to a third aspect of the invention, a composition assisting method comprises:

acquiring photographed image data;

extracting an image feature amount from the photographed image data;

detecting a kind of an object corresponding to the extracted image feature amount from an object database storing data in which the image feature amount extracted from the image data is associated with the kind of the object corresponding to the image feature amount, for each of objects;

searching for composition assisting information corresponding to the detected kind of the object from a composition database storing data in which the kind of the object and composition assisting information corresponding to the kind of the object are associated with each other;

extracting characteristic information regarding each image data from the photographed image data and sample image data related to the composition assisting information searched for by the search unit, and determining presentation priority in which the composition assisting information searched for by the search unit are presented to a user, based on characteristic information differences; and displaying the composition assisting information based on the determined presentation priority.

According to a fourth aspect of the invention, a non-transitory storage medium stores a composition assisting program for causes a computer to realize the functions of:

extracting an image feature amount from the photographed image data;

detecting a kind of an object corresponding to the extracted image feature amount from an object database storing data in which the image feature amount extracted from the image data is associated with the kind of the object corresponding to the image feature amount, for each of objects;

searching for composition assisting information corresponding to the detected kind of the object from a composition database storing data in which the kind of the object and composition assisting information corresponding to the kind of the object are associated with each other;

extracting characteristic information regarding each image data from the photographed image data and sample image data related to the composition assisting information searched for by the search unit, and determining presentation priority in which the composition assisting information searched for by the search unit are presented to a user, based on characteristic information differences; and displaying the composition assisting information based on the determined presentation priority.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute apart of the specification, illustrate embodiments of the invention, and together with the general description given above and the detailed description of the embodiments given below, serve to explain the principles of the invention.

DETAILED DESCRIPTION OF THE INVENTION

A description will now be given with reference to the accompanying drawings of an imaging apparatus, a composition assisting apparatus and a composition assisting method according to an embodiment of the present invention.

[First Embodiment]

Figure 1:
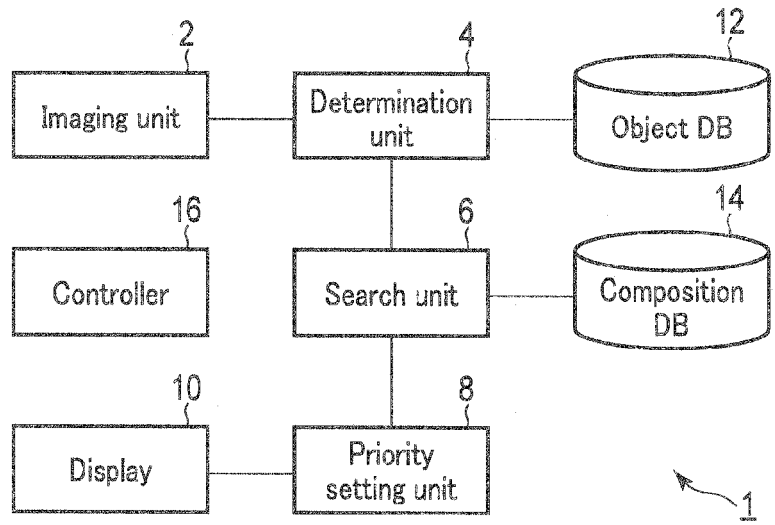
FIG. 1 illustrates an example of the configuration of an imaging apparatus according to the first embodiment of the present invention.

FIG. 1 illustrates an example of the configuration of an imaging apparatus according to the first embodiment. As shown in FIG. 1, the imaging apparatus 1 comprises an imaging unit 2, a determination unit 4, a search unit 6, a priority setting unit 8, a display 10, an object database (hereinafter referred to simply as "object DB") 12, a composition database (hereinafter referred to simply as "composition DB"), and a controller 16.

The imaging unit 2 photographs an object and generates image data thereon, when a shutter (not shown) is depressed half/fully. Image data generated when the shutter (not shown) is depressed half will be collectively referred to as "temporarily photographed image data."

In connection with the first embodiment, reference will be made to the case where composition assisting processing is executed using the temporarily photographed image data by way of example. In place of the temporarily photographed image data, actually photographed image data generated when the shutter (not shown) is depressed fully and stored in a storage medium (not shown) or image data obtained irrespectively of a shutter operation (so-called through imaging) may be used to execute the composition assisting processing. For example, where the actually photographed image data are used in place of the temporarily photographed image data, the composition assisting information will be referred to in the subsequent photographing operations.

The determination unit 4 extracts an image feature amount from the temporarily photographed image data, and determines the kind of object of the temporarily photographed image data, based on the image feature amount and the data stored in the object DB 12. In other words, the determination unit 4 extracts an image feature amount from photographed image data, and determines the kind of object of the photographed image data, based on the extracted image feature amount and the data stored in the object database 12.

In more detail, the determination unit 4 can determine the kind of object, using various techniques generally performed as object recognition. To be specific, LBP, SIFT, SURF, ORB and HSV histograms are extracted from the image data. The kind of object can be determined by machine learning such as SVM, using such histograms.

The search unit 6 searches the composition DB 14 for composition assisting information in accordance with the kind of object which the determination unit 4 determines for the temporarily photographed image data. In other words, the search unit 6 detects composition assisting information corresponding to the photographed image data from the composition database 14, based on the kind of object determined by the determination unit 4 and the data stored in the composition database 14.

One or more composition assisting information detected by the search unit 6 are candidates of composition assisting information which are to be shown to the user. In general, the composition assisting information to be shown to the user includes two or more candidates; however, the composition assisting information may be only one candidate. The composition assisting information detected by the above processing and shown as candidate is given priorities by the priority setting unit 8. They are shown to the user (displayed on the display 10) based on the priorities (a candidate with a higher priority is shown in preference to a candidate with a lower priority).

The composition assisting information includes at least one of: "sample registration image data" representing an example of a photographic composition; "setting information" for setting photographic conditions; and "guide information" which are explanations to the user about matters that are not entered into the photographing apparatus as photographic conditions, such as a photographic angle and key points which the user should bear in mind at the time of photography.

The priority setting unit 8 extracts characteristic information from the temporarily photographed image data acquired by the imaging unit 2 and the sample registration image data which the search unit 6 detects regarding the composition assisting information. The priority setting unit 8 determines a presentation priority for each item of the composition assisting information based on the characteristic information differences.

In other words, the priority setting unit 8 extracts characteristic information regarding each image from the photographed image data and the sample image data related to the composition assisting information detected by the search unit 6, and determines presentation priority in which the composition assisting information detected by the search unit 6 are presented to the user, based on the characteristic information differences.

Specifically, examples of the characteristic information include "image feature amounts" extracted by the determination unit 4, the "photographic conditions" under which the temporarily photographed image data are acquired, etc.

More specifically, the priority setting unit 8 checks the temporarily photographed image data and the sample registration image data and computes "characteristic information differences" of the same kind. The priority setting unit 8 determines a higher priority for composition assisting information about which more significant differences are detected.

For example, if an image feature amount is used as characteristic information, a shift amount between the position where an object is detected in the temporarily photographed image data and the position where the object is detected in the sample registration image data may be used as the "characteristic information differences." Alternatively, the differences in the shift amount of the areas of the object (i.e., the area differences) may be used as "characteristic information differences." Furthermore, the superposition integral of image feature amounts (templates) represented by low-resolution brightness values (e.g., 16×16 pixels) extracted from image data may be used as "characteristic information differences."

If the image feature amounts required for computation of the "characteristic information differences" differ from the image feature amounts required for identifying an object, then the priority setting unit 8 may extract image feature amounts required for the computation of "characteristic information differences."

For example, where the photographic conditions are used as characteristic information, the differences in the values of a camera's posture (acceleration sensor information), a focal distance, an aperture, a shutter speed, etc. may be used as "characteristic information differences." A combination of differences in a variety of photographic conditions may be used as "characteristic information differences."

The display 10 displays the composition assisting information detected by the search unit 6, based on the priority determined by the priority setting unit 8. In other words, the display 10 displays the composition assisting information based on the priority determined by the priority setting unit 8.

The object DB 12 stores data associating an image feature amount of image data of an object with the kind of object corresponding to the image feature amount. The object DB 12 stores that data for each of objects. In other words, the object DB 12 stores data in which an image feature amount extracted from image data is associated with the kind of object corresponding to the image feature amount, for each of objects.

The composition DB 14 stores data in which the kind of each object and the composition assisting information corresponding to the kind are associated with each other. In other words, the composition DB 14 stores data in which the kind of object and the composition assisting information corresponding to the kind of object are associated with each other.

The controller 16 is, for example, a central processing unit (CPU) and performs overall control of each unit of the imaging apparatus 1.

Figure 2:
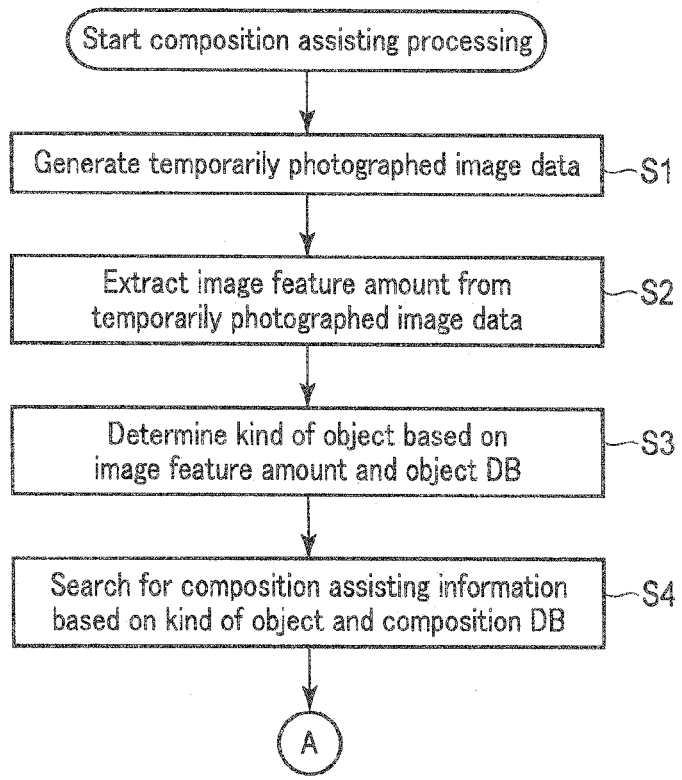
FIG. 2 is a first part of a flowchart illustrating how the composition assisting information is provided by the imaging apparatus of the first embodiment of the present invention.
Figure 3:
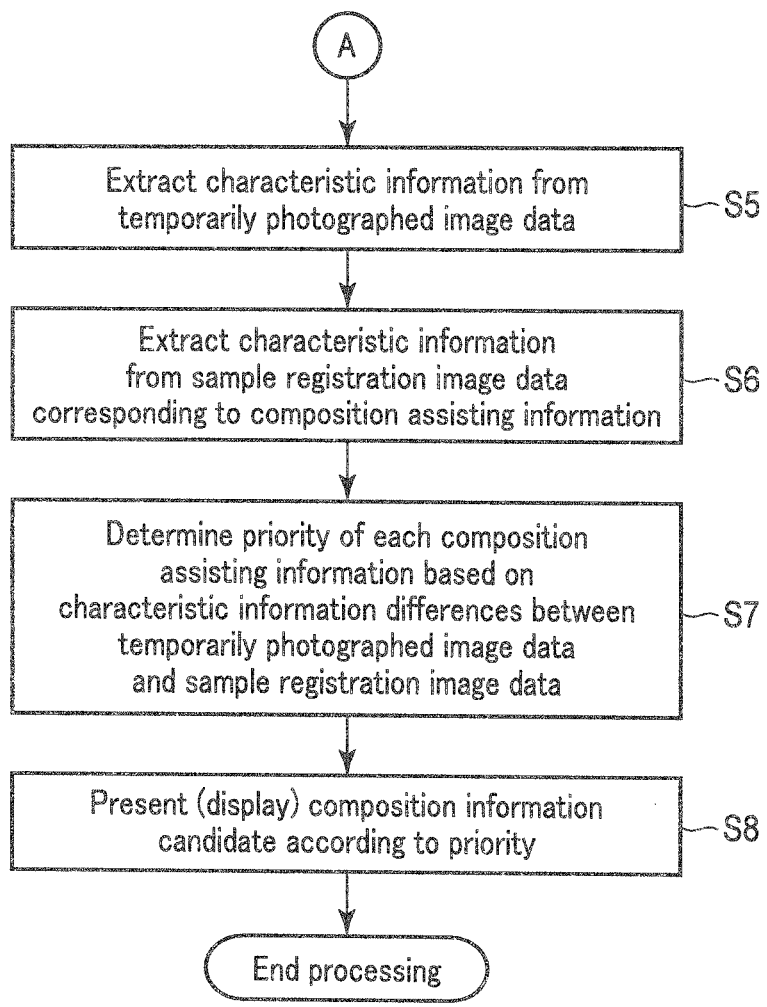
FIG. 3 is a second part of the flowchart illustrating how the composition assisting information is provided by the imaging apparatus of the first embodiment of the present invention.

A description will now be given of composition assisting processing performed by the controller 16 of the imaging apparatus of the first embodiment. FIGS. 2 and 3 are flowcharts illustrating the composition assisting processing performed by the controller 16 of the imaging apparatus of the first embodiment.

The imaging unit is controlled by the user's half depression of the shutter (not shown) and generates temporarily photographed image data (Step S1)

Under the control of the controller 16, the determination unit 4 extracts an image feature amount from the temporarily photographed image data generated in Step S1 (Step S2).

Under the control of the controller 16, the determination unit 4 refers to the data stored in the object DB 12, based on the image feature amount extracted in Step S2, and determines the kind of object corresponding to the temporarily photographed image data.

Under the control of the controller 16, the search unit 6 searches the composition DB 14 for a composition assisting information candidate in accordance with the kind of object determined for the temporarily photographed image data in Step S3 (Step S4).

Under the control of the controller 16, the priority setting unit 8 extracts characteristic information from the temporarily photographed image data (Step S5) and extracts characteristic information from the sample registration image data corresponding to the composition assisting information searched for in Step S4 (Step S6). Under the control of the controller 16, the priority setting unit 8 checks the temporarily photographed image data and the sample registration image data and computes "differences" among characteristic information of the same kind. Based on the computed differences, the priority setting unit 8 determines priority in which the composition assisting information is presented to the user (Step S7).

Under the control of the controller 16, the display 10 displays the composition information candidate detected in step S4 in the display manner corresponding to the priority determined in step S7 (Step S8).

Figure 4:
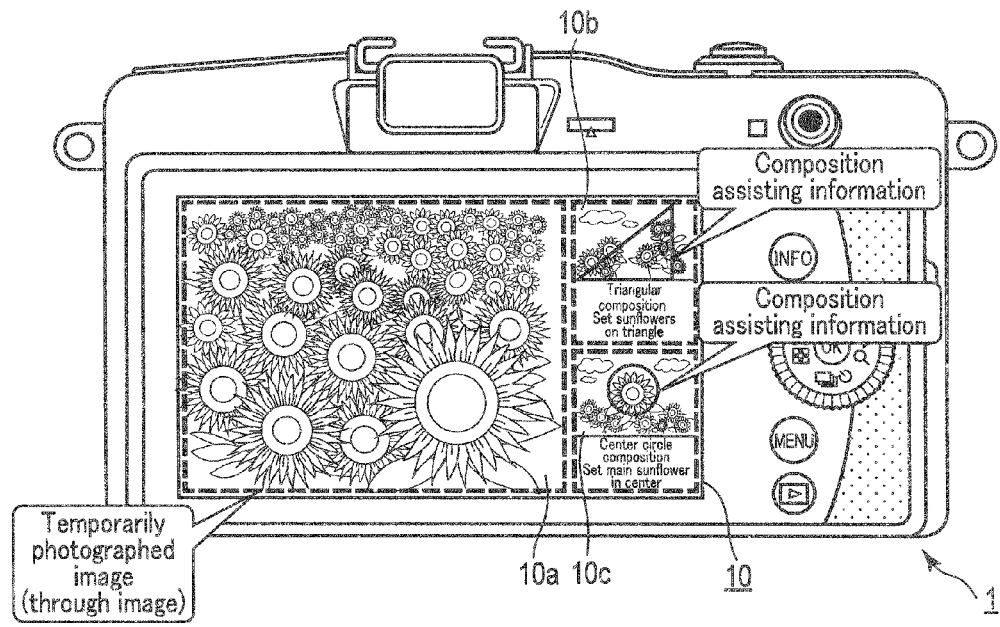
FIG. 4 shows an example of a manner in which the composition assisting information are displayed on the display of the imaging apparatus.

A specific description will be given of an example of the manner in which the composition assisting information is displayed. FIG. 4 shows an example of the manner in which the composition assisting information is displayed on the display 10 of the imaging apparatus 1. In the example shown in FIG. 4, the first display area 10a of the display 10 has the widest display area and configured to display temporarily photographed image data. A second display area 10b is an upper display portion adjacent to the first display area 10a and is configured to display composition assisting information having the highest priority. A third display area 10c is a lower display portion adjacent to the first display area 10a and is configured to display composition assisting information having the second highest priority. In the example shown in FIG. 4, the "guide information" described above is displayed together with the "sample registration image data" as the composition assisting information.

As shown in FIG. 4, composition assisting information is selectable by the user. The user selects the composition assisting information which he or she likes from among the composition assisting information being displayed. Responsive to the selection, the controller 16 displays on the display 10 the "setting information" and "guide information" included in the selected composition assisting information.

With respect to information regarding the photographic compositions which the user is not aware of (or does not know), the user should first recognize the characteristic information differences by actually looking at the photographic compositions. Therefore, when composition assisting information candidates are shown on the display 10, the sample registration images included in the composition assisting information should be displayed, and the "setting information" and the "guide information" included in the composition assisting information should be displayed at a minimum.

If the display area on the display 10 is restricted and all composition assisting information cannot be simultaneously shown on the display 10, a scroll function may be used, by which the information on the display area can be scrolled so that the user can view all composition assisting information.

A "through image" at the moment of time may be displayed on the first display area 10a, in place of the temporarily photographed image data.

The setting defined in the "setting information" included in the composition assisting information may be automatically executed in response to the composition assisting information being selected by the user.

As described above, the first embodiment provides an imaging apparatus, a composition assisting apparatus and a composition assisting method which can provide the user with appropriate photographic compositions (including photographic compositions which the user does not know) in accordance with an object to be photographed.

The imaging apparatus, composition assisting apparatus and composition assisting method of the first embodiment present to the user sample registration image data which shows the same kind of object as the temporarily photographed image data and which has a photographic composition greatly different from that of the temporarily photographed image data. By virtue of this feature, the user is provided with information that guides the user to a photographic composition the user is not aware of (or does not know), i.e., information that assists the setting of a photographic composition.

Where "characteristic information differences" are great between the temporarily photographed image data and the sample registration image data, there is a discrepancy between the actual state and the composition assisting information in regard to the photography of the object determined based on the image feature amount of the temporarily photographed image data. This means that the user is not aware of the photographic composition presented in the composition assisting information. Since the photographic information are presented to the user in preference to the others, the user is thereby informed of the composition assisting information and can photograph an object using that information.

Where numerical information obtained from the sensor of the main body of the imaging apparatus 1 as characteristic information, the computation of characteristic information does not impose a heavy load.

The determination unit 4, search unit 6, priority setting unit 8, display 10, object DB 12 and composition DB 14, described above in connection with the first embodiment, need not be incorporated in the imaging apparatus 1. For example, they may be incorporated in a server apparatus capable of communicating with the imaging apparatus. Where this structure is adopted, the imaging apparatus and the server apparatus jointly function as one composition assisting apparatus.

[Second Embodiment]

A description will now be given of an imaging apparatus, a composition assisting apparatus and a composition assisting method according to the second embodiment of the present invention. To avoid repetition of descriptions, only the differences between the first and second embodiments will be described.

According to the second embodiment, information such as that regarding a photographing mode, a kind of an art filter and a lens type are used as the characteristic information mentioned above, and the differences in them are used as "characteristic information differences." To be specific, data obtained by quantifying the "characteristic information differences" are stored in a memory (not shown) of the priority setting unit 8 as a table, and "characteristic information differences" are obtained by referring to the table. Information on photographic conditions such as a focusing distance, an exposure amount, an image blur amount, and saturation may be used as characteristic information.

By determining the characteristic information as above, a "difference in exposure" can be added as an index for determining priority, when composition assisting information indicates that the exposure should be slightly excessive for some kind of object. That is, the "change of exposure" which is not aware of by the user can be suggested to the user.

Furthermore, the characteristic information are not limited to what are acquired as the parameters of a camera. That is, the characteristic information may be information that can be obtained by executing image processing for the temporarily photographed image data and the sample registration image data.

As described above, the second embodiment has advantages similar to those of the imaging apparatus, composition assisting apparatus and composition assisting method of the first embodiment. In addition, since the second embodiment computes "characteristic information differences" from not only the image data but also the parameters obtained directly from the imaging apparatus 1, the parameters do not have to be computed. Thus, the imaging apparatus, composition assisting apparatus and composition assisting method of the second embodiment enable high-speed processing.

[Third Embodiment]

A description will now be given of an imaging apparatus, a composition assisting apparatus and a composition assisting method according to the third embodiment of the present invention. To avoid repetition of descriptions, only the differences between the first and third embodiments will be described.

As described above, the setting defined in the "setting information" included in the composition assisting information can be automatically executed in response to the composition assisting information being selected by the user. In the third embodiment, however, the setting is not automatically executed; instead, setting items are displayed on the display 10 as "changeable elements", and the user can determine each setting while looking at the display.

Figure 5:
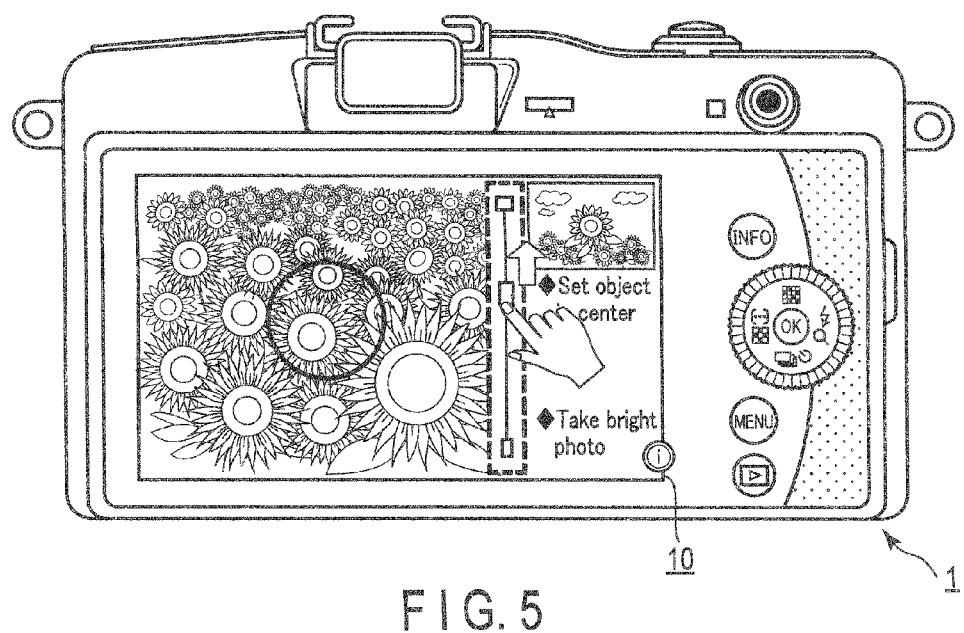
FIG. 5 shows an example of a manner in which the composition assisting information is displayed on the display of the imaging apparatus.

To be specific, if "setting information" indicate that the exposure should be "+⅓EV", the display 10 displays a message to the effect that "Let's take a brighter picture." Simultaneous with this, values for changing the exposure and information on the operating section (e.g., a button type or a slider type such as that shown in FIG. 5) are displayed on the display 10. Based on what are shown on the display 10, the user can enter setting for changing the exposure. FIG. 5 shows an example of the manner in which the composition assisting information are displayed on the display 10 of the imaging apparatus 1.

Even an operation which cannot be executed by operating a switch or the like, such as the interchange of lenses, the instruction to execute the operation may be shown to the user (for example, on the display 10) so that the user can perform the operation.

Incidentally, how to combine the "setting information" and "guide information" to obtain composition assisting information and how to provide information for photographing an object image using a photographic composition similar to that of the sample registration image data (the photographing information may be explanations performed for the steps and will be abbreviated as step-by-step information), are regarded as methods for presenting available composition assisting information.

In this case, "setting information" and a related matter (for example, "Let's take a brighter picture") will constitute effective composition assisting information if a setting change menu appears on the display in response to the user's selection of a description of the related matter.

Important information regarding the setting and an explanatory view may be superimposed on the first display area 10a (a through image). When the step-by-step information are selected by the user, the important information and the explanatory view may be switched to those related to the selected item.

As described above, the third embodiment has advantages similar to those of the imaging apparatus, composition assisting apparatus and composition assisting method of the first embodiment. In addition, the imaging apparatus, composition assisting apparatus and composition assisting method of the third embodiment assist the user to change the setting alone so that the user can easily learn the operations for changing the setting. That is, the imaging apparatus, composition assisting apparatus and composition assisting method of the third embodiment enable the user to acquire photography skills. Even when the user is using an imaging apparatus that does not have a function of presenting composition assisting information, the user can notice that there is a photographing method (photographic composition) available and change the setting accordingly.

To be more specific, elements for changing the setting (namely, the setting assist information) are presented to the user based on the setting information related to the composition assisting information, and the user can change the setting alone. The user can easily learn how the setting should be changed.

As a result, the user's skill can be improved, accordingly. Even if no composition assisting information are presented, the user is expected to notice that there is a photographing method available.

[Fourth Embodiment]

A description will now be given of an imaging apparatus, a composition assisting apparatus and a composition assisting method according to the fourth embodiment of the present invention. To avoid repetition of descriptions, only the differences between the first and fourth embodiments will be described.

According to the fourth embodiment, the image data which the user acquires by the photography using the composition assisting information are used as sample registration image data of the composition assisting information stored in the composition DB 14. By virtue of this feature, the user can visually recognize the image data acquired by the photography using the composition assisting information, as sample registration image data. The user can quickly notice the information presented by the composition assisting information, by merely looking at the sample registration image data displayed on the display 10.

As described above, the fourth embodiment has advantages similar to those of the imaging apparatus, composition assisting apparatus and composition assisting method of the first embodiment. In addition, the imaging apparatus, composition assisting apparatus and composition assisting method of the fourth embodiment assist the determination of a photographic composition based on the image data which are acquired through the photography performed by the user alone, and the user can notice the information presented by the composition assisting information by merely looking at the sample registration image data.

[Fifth Embodiment]

A description will now be given of an imaging apparatus, a composition assisting apparatus and a composition assisting method according to the fifth embodiment of the present invention. To avoid repetition of descriptions, only the differences between the first and fifth embodiments will be described.

According to the fifth embodiment, a predetermined threshold value is determined for the "characteristic information difference" (threshold value will be referred to as a "characteristic threshold"), and the criterion for determination priority is changed based on the comparison between the characteristic threshold and a "characteristic information difference." The characteristic threshold can be stored, for example, in a memory (not shown) of the priority setting unit 8.

To be specific, with respect to the composition assisting information whose "characteristic information differences" are not larger than the characteristic threshold, the priority setting unit 8 determines a higher priority in accordance with a decrease in the value of each "difference." On the other hand, with respect to the composition assisting information whose "characteristic information differences" are larger than the characteristic threshold, the priority setting unit 8 determines priorities which are lower than the priorities of the composition assisting information whose "characteristic information differences" are not larger than the characteristic threshold and which increase in accordance with an increase in the value of each "difference."

Figure 6:
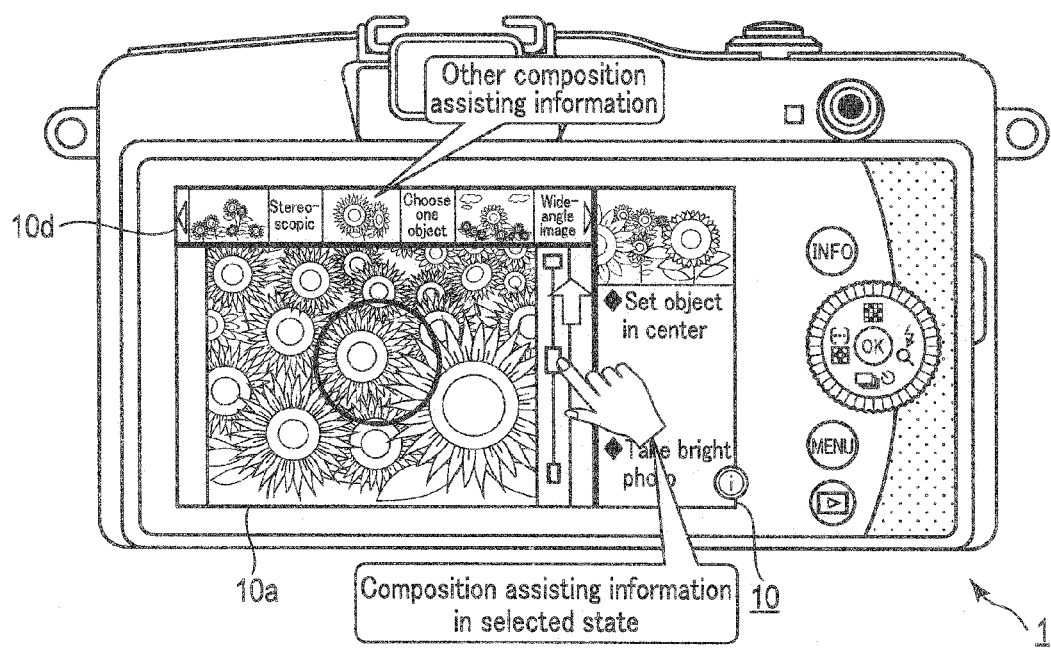
FIG. 6 shows an example of a manner in which the composition assisting information is displayed on the display of the imaging apparatus.

The controller 16 controls the display 10 to display a plurality of composition assisting information in the descending order of priorities. As shown in FIG. 6, the controller 16 controls the display 10 to display the composition assisting information having the highest priority on the first display area 10a and display the other composition assisting information in a fourth display area 10d located on the upper side of the first display area 10a. FIG. 6 shows an example of the manner in which the composition assisting information are displayed on the display 10 of the imaging apparatus 1.

It should be noted that sample registration image data constituting the composition assisting information whose "characteristic information differences" are not larger than the predetermined threshold are image data which closely resemble temporarily photographed image data. The fifth embodiment is featured in that if there is sample registration image data closely resembling temporarily photographed image data, the photographic composition of the sample registration image data is presented to the user. By so doing, a photographic composition similar to the photographic composition intended by the user (i.e., a particular photographic composition the user is conscious of) can be presented.

It should be noted, however, that the photographic composition is not the one intended by the user (i.e., the user is not conscious of any particular photographic composition). Therefore, the composition assisting information whose characteristic information differences are not smaller than the predetermined characteristic threshold, are presented in the descending order of "characteristic information differences", as described above. By virtue of this feature, the user can notice suggestions about the photographic composition in any case.

Where the display 10 displays the sample registration image data whose "characteristic information differences" are not larger than the predetermined threshold, a symbol (a predetermined mark may be shown on the display 10, or predetermined sound or vibration may be generated) may be simultaneously indicated. In this case, it is desirable that the symbol be shown in such a manner as not to interfere with the photographing operation.

As described above, the fifth embodiment has advantages similar to those of the imaging apparatus, composition assisting apparatus and composition assisting method of the first embodiment. In addition, in the case where the temporarily photographed image data are acquired in a photographic composition similar to that suitable for an object to be photographed, composition assisting information having a photographic composition similar to that of the temporarily photographed image data are presented instead of presenting composition assisting information having a wide photographic composition (which differs from the photographic composition of the temporarily photographed image data). By so doing, the imaging apparatus, composition assisting apparatus and composition assisting method of the fifth embodiment save the trouble the user may suffer at the time of photography. To be more specific, where a particular photographic composition is intended by the user, the user can notice not only a photographic composition greatly different from that which may be suitable at the moment of time but also information permitting the user to visually recognize how the intended photographic composition is different from that suitable photographic composition. In short, the imaging apparatus, composition assisting apparatus and composition assisting method of the fifth embodiment enable the user to easily notice whether the intended particular photographic composition is suitable.

In addition, the composition assisting information having a photographic composition similar to that of the photography corresponding to the temporarily photographed image data are displayed in the selected state, and the amount of operation which the user has to perform for obtaining both detailed setting information and guide information can be reduced.

Where composition assisting information having a photographic composition similar to that of the photography corresponding to the temporarily photographed image data are displayed, a symbol representing the state is indicated. By so doing, the user is notified of the state, without the concentration at the time of photograph being interfered with.

[Sixth Embodiment]

A description will now be given of an imaging apparatus, a composition assisting apparatus and a composition assisting method according to the sixth embodiment of the present invention. To avoid repetition of descriptions, only the differences between the first and sixth embodiments will be described.

According to the sixth embodiment, processing is executed in consideration of the user's learning level concerning the operation of the imaging apparatus. To be specific, according to the sixth embodiment, priority is determined utilizing both a threshold value concerning the user's learning level (hereinafter referred to simply as "learning level threshold") and the "characteristic threshold" described in relation to the fifth embodiment. The learning level and learning level threshold of each user can be stored, for example, in a memory (not shown) of the priority setting unit 8.

According to the sixth embodiment, where the user's learning level is less than the learning level threshold, higher priorities are determined for composition assisting information about which more significant characteristic information differences are detected, as in the first embodiment.

On the other hand, where the user's learning level is not less than the learning level threshold, the priorities of composition assisting information whose "characteristic information differences" are less than the characteristic threshold are set to be higher in accordance with a decrease in the value of each difference, as in the fifth embodiment. With respect to the composition assisting information whose "characteristic information differences" are larger than the characteristic threshold, priorities are determined to be lower than the priorities of the composition assisting information whose "characteristic information differences" are not larger than the characteristic threshold and to increase in accordance with an increase in the value of each "difference"

The learning level of each user can be determined as follows: The number of times each user actually refers to the composition assisting information and executes photography is counted, and the learning level of each user is determined based on the count. Alternatively, the learning level of each user may be determined based on an accumulated value of "characteristic information differences" between (i) the image data each user acquires in the photography performed referring to the composition assisting information and (ii) sample registration image data relating to the composition assisting information referred to by the user.

As described above, the sixth embodiment has advantages similar to those of the imaging apparatuses, composition assisting apparatuses and composition assisting methods of the first and fifth embodiments. In addition, the imaging apparatus, composition assisting apparatus and composition assisting method of the fifth embodiment enable appropriate photography in accordance with the learning level of each user.

That is, the imaging apparatus, composition assisting apparatus and composition assisting method of the sixth embodiment provide a user having a high learning level with a photographic composition similar to the photographic composition intended by the user (namely, the photographic composition of the temporarily photographed image data in which the user's intention is reflected), and provide a user having a low learning level with an appropriate photographic composition which the user cannot think of without the composition assisting information.

The sixth embodiment has been contrived on the assumption that a user having a high learning level can photograph an image in an intended particular photographic composition. The user can notice not only a photographic composition greatly different from that which may be suitable at the moment of time but also information permitting the user to visually recognize how the intended photographic composition is different from that suitable photographic composition. In short, the sixth embodiment enables the user to easily notice whether the intended particular photographic composition is suitable.

[Seventh Embodiment]

A description will now be given of an imaging apparatus, a composition assisting apparatus and a composition assisting method according to the seventh embodiment of the present invention. To avoid repetition of descriptions, only the differences between the first and seventh embodiments will be described.

According to the seventh embodiment, the priority setting unit 8 determines a priority in consideration of the specifications of the imaging apparatus 1 (e.g., the ISO sensitivity, shutter speed, focal distance, aperture, etc.). Even if the composition assisting information has a large "characteristic information difference," the setting information of that composition assisting information may not be realized due to the restrictions imposed by the specifications of the imaging apparatus 1. In this case, the composition assisting information should not be presented to the user (for example, the composition assisting information may be excluded from the priority setting items)

For example, if photography is performed in a dark room, whether the amount of light is sufficient at the shutter speed based on the composition assisting information can be estimated based on the photographic conditions of the temporarily photographed image data. If the amount of light is estimated to be insufficient, then the composition assisting information cannot be realized due to the restrictions on the specifications of the imaging apparatus 1, and the composition assisting information are excluded from the priority setting items.

If the amount of light is sufficient when the expanded ISO sensitivity is selected but is insufficient when the normal ISO sensitivity is selected, then the priority based on the "characteristic information differences" may be decreased (the default priority may be decreased by a predetermined number of unit values). For example, processing such as "decreasing the priority by one value" or "multiplying the quantitatively-expressed priority (the larger the value is, the higher the priority) with a factor of less than 1" may be executed.

As described above, the seventh embodiment has advantages similar to those of the imaging apparatuses, composition assisting apparatuses and composition assisting methods of the first embodiment. In addition, since the priorities are determined even in consideration of the specifications of the imaging apparatus, the imaging apparatus, composition assisting apparatus and composition assisting method of the seventh embodiment can provide the user with feasible composition assisting information.

In addition, since the priories are determined in consideration of the specifications of the imaging apparatus 1, the user can easily obtain feasible setting information.

[Eighth Embodiment]

A description will now be given of an imaging apparatus, a composition assisting apparatus and a composition assisting method according to the eighth embodiment of the present invention. To avoid repetition of descriptions, only the differences between the first and eighth embodiments will be described.

According to the eighth embodiment, information representing composition assisting information selected by the user (the history information represents the number of times the composition assisting information were actually selected and when they were selected; hereinafter referred to simply as "selection history information") are considered when priorities are determined.

The priority setting unit 8 refers to the priorities determined based on the "characteristic information differences" and extracts the (initial display number—1) composition assisting information in the descending order. Subsequently, the priority setting unit 8 checks the extracted composition assisting information and lowers the priorities of composition assisting information which were displayed but were not selected by the user, based on the selection history information. (The priority is decreased from the initial display number). For example, a threshold value may be determined for selection history, and the priorities of the composition assisting information whose (selection times/display times) are less than the threshold value may be decreased.

Even after the priorities are changed, the order of the priorities of the composition assisting information is maintained. For example, if the priorities of the composition assisting information which are "2nd, 4th and 5th" in the priority order are decreased to priorities less than 8, the decreased priorities will be "9th, 10th and 11th" in the priority order and the relations among them in the priority order are maintained.

The above processing for the priority change will be repeated until the composition assisting information not selected in the past are not included in the (initial display number—1) composition assisting information. In the last frame of the initial display, one of composition assisting information is selected at random from the composition assisting information having priorities lower than those of the (initial display number—1) composition assisting information.

In the processing for selecting composition assisting information at random, composition assisting information that were not included in the initially-displayed ones, and the composition assisting information that corresponds to a photographic composition not used in the past may be weighted so as to increase the possibility of such composition assisting information being used in the feature.

By the above processing, composition assisting information that are "equal in number to the initially displayed ones" are determined, including (i) (initial display number—1) composition assisting information selected based on both "characteristic information differences" and "selection history information", and (ii) one composition assisting information selected at random from among the composition assisting information those priorities are lower than those of the initially-displayed composition assisting information.

With respect to the composition assisting information that were selected and used in actual photography, the priorities of such composition assisting information may be changed in relation to the elapsed times from the times when they are selected in practice. For example, the priority of composition assisting information may be decreased if the elapsed time from the time when it was used in the last photography is within one week; it may be increased if the elapsed time is more than one week. Furthermore, with respect to the composition assisting information that is used again in photography, the priorities of such composition assisting information may be decreased until another one month elapses. After the elapse of one month, the priorities of the composition assisting information may be increased.

As described above, the eighth embodiment has advantages similar to those of the imaging apparatuses, composition assisting apparatuses and composition assisting methods of the first embodiment. In addition, since the selection history information are taken into consideration, the imaging apparatus, composition assisting apparatus and composition assisting method of the eighth embodiment do not provide the user with the same composition assisting information even if photography is performed in similar situations (composition assisting information not aware of by the user can be shown). Furthermore, since the priorities are changed in accordance with the lapse times described above, the composition assisting information can be presented efficiently, enhancing the effect of the learning by the user.

As can be seen from this, the use of the selection history information in the priority setting enables the detection of a group of composition assisting information which reflects the user's experience and the user's intention (select/not select)

As a result, composition assisting information not aware of by the user can be efficiently displayed on the display 10.

[Ninth Embodiment]

A description will now be given of an imaging apparatus, a composition assisting apparatus and a composition assisting method according to the ninth embodiment of the present invention. To avoid repetition of descriptions, only the differences between the first and ninth embodiments will be described.

According to the ninth embodiment, the priority setting unit 8 determines priorities of composition assisting information, using not only characteristic information but also second photography condition information described below. The second photography condition information is, for example, position information, altitude information, date information, sound information, etc. According to the ninth embodiment, priorities are determined based on "characteristic information differences," and the priorities are corrected or changed based on "second photography condition information differences." To be specific, a higher priority is determined for composition assisting information in accordance with a decrease in the "second photography condition information difference."

The sample registration image data on the composition assisting information whose "second photography condition information difference" is small are image data that are acquired in the photography conditions (e.g., seasons, time periods of a day, places of photography, etc.) similar to those of the temporarily photographed image data.

As described above, the ninth embodiment has advantages similar to those of the imaging apparatuses, composition assisting apparatuses and composition assisting methods of the first embodiment. In addition, since similarity of photographic conditions is determined based on "second photography condition information differences," the imaging apparatus, composition assisting apparatus and composition assisting method of the ninth embodiment enable selection of feasible and appropriate composition assisting information from among the composition assisting information whose priorities are determined based on "characteristic information differences" and provide the user with such selected composition assisting information.

That is, a determination is made based on the second photography condition information differences as to whether the photography environment is similar to the photography environment of the temporarily photographed image data, and the results obtained thereby are reflected in the determination of priorities. As a result, composition assisting information more suitable for the photography environment can be selected from the composition assisting information whose priorities are determined based on characteristic information differences. Therefore, the user is allowed to notice an optimal photographic composition.

The first to ninth embodiments have been described, but the present invention is in no way limited to these embodiments. Needless to say, the present invention can be modified in various manners, without departing from the spirit and scope of the invention. For example, the operations of the imaging unit described in relation to the above embodiments may be stored in the form of programs executable by the controller 16 (which is a computer). The programs can be stored in the storage mediums of external storage devices, such as a memory card (e.g., a ROM card, or a RAM card), a magnetic disk (e.g., a hard disk), an optical disk (e.g., a CD-ROM or a DVD), or a semiconductor memory, and distributed. The controller 16 reads the programs from the storage mediums of the external storage devices, and the operations can be executed and controlled based on the read programs.

In addition, the above-described embodiments include inventions of various stages, and a variety of inventions can be derived by properly combining structural elements disclosed in connection with the embodiments. For example, if the object of the invention is achieved and the advantages of the invention are attained even after some of the structural elements disclosed in connection with the embodiments are deleted, the structure made up of such structural elements can be extracted as an invention.

What is claimed is:

1. An imaging apparatus comprising:
    an object database storing data in which an image feature amount extracted from image data is associated with a kind of an object corresponding to the image feature amount, for each of a plurality of objects;
    a composition database storing data in which the kind of the object and composition assisting information corresponding to the kind of the object are associated with each other;
    an imaging device;
    a display; and
    a computer which executes a program stored in a memory to perform operations comprising:
    extracting an image feature amount from photographed image data which is acquired by photography by the imaging device, and determining the kind of the object of the photographed image data, based on the data stored in the object database;
    detecting composition assisting information corresponding to the photographed image data from the composition database, based on the determined kind of the object and the data stored in the composition database;
    extracting characteristic information regarding each image from the photographed image data and sample image data related to the detected composition assisting information, and determining a presentation priority in which the detected composition assisting information is presented to a user, based on characteristic information differences; and displaying, on the display, the composition assisting information based on the determined priority;
wherein the priority is increased in accordance with an increase in the difference among the characteristic information.

2. The imaging apparatus according to claim 1, wherein the characteristic information are information regarding photography by which image data regarding the characteristic information is acquired.

3. The imaging apparatus according to claim 1, wherein the characteristic information includes information representing at least one of a posture of the imaging apparatus, a focal distance, an aperture, and a shutter speed, which are used in the photography by which image data regarding the characteristic information is acquired.

4. The imaging apparatus according to claim 1, wherein the characteristic information includes information representing at least one of a photography mode of the imaging apparatus, a kind of an art filter, a lens type, a focusing distance, an exposure amount, image blur amount, and saturation, which are used in the photography by which image data regarding the characteristic information is acquired.

5. The imaging apparatus according to claim 1, wherein the composition assisting information includes setting information regarding setting of the imaging apparatus and guide information regarding a setting operation of the imaging apparatus.

6. The imaging apparatus according to claim 1, wherein the composition assisting information includes sample image data representing a sample of image data acquired in photography performed using a photographic composition based on the composition assisting information.

7. The imaging apparatus according to claim 6, wherein the sample image data is image data which the user acquires in photography using composition assisting information.

8. The imaging apparatus according to claim 1, wherein the computer compares the characteristic information differences with a predetermined threshold, determines a priority of each composition assisting information whose difference is smaller than the threshold such that the priority is increased in accordance with a decrease in the difference, and determines a priority of each composition assisting information whose difference is equal to or larger than the threshold such that the priority is lower than the priority of each composition assisting information whose difference is smaller than the threshold and is increased in accordance with an increase in the difference.

9. The imaging apparatus according to claim 8, the operations further comprising displaying a symbol when the composition assisting information whose characteristic information differences are smaller than the predetermined threshold are presented to the user.

10. The image apparatus according to claim 1, the operations further comprising displaying the detected composition assisting information such that composition assisting information which is detected which has a highest priority is selected.

11. The imaging apparatus according to claim 1, wherein the computer compares the characteristic information differences with a predetermined threshold, and where a learning level of the user regarding the imaging apparatus is higher than a predetermined learning level, the computer determines a priority of each composition assisting information whose difference is smaller than the threshold such that the priority is increased in accordance with a decrease in the difference, and determines a priority of each composition assisting information whose difference is equal to or larger than the threshold such that the priority is lower than the priority of each composition assisting information whose difference is smaller than the threshold and is increased in accordance with an increase in the difference.

12. The imaging apparatus according to claim 1, wherein the computer excludes composition assisting information which cannot be implemented due to restriction imposed by specifications of the imaging apparatus from priority setting, based on information on the specifications of the imaging apparatus, and decreases a priority of composition assisting information having setting inappropriate for the specifications of the imaging apparatus.

13. The imaging apparatus according to claim 1, wherein the computer changes the priority of each composition assisting information, based on selection history information representing a selection history of composition assisting information by a user.

14. The imaging apparatus according to claim 1, wherein the computer changes the priority of each composition assisting information in relation to an elapsed time from a time when the composition assisting information was selected last.

15. The imaging apparatus according to claim 1, wherein the computer changes the priority of each composition assisting information, based on photograph condition information regarding photographic conditions.

16. The imaging apparatus according to claim 15, wherein the photograph condition information includes at least one of position information, altitude information, date information, and sound information.

17. A composition assisting apparatus comprising:
an object database storing data in which an image feature amount extracted from image data is associated with a kind of an object corresponding to the image feature amount, for each of a plurality of objects;
a composition database storing data in which the kind of the object and composition assisting information corresponding to the kind of the object are associated with each other;
a display;
a computer which executes a program stored in a memory to perform operations comprising:
extracting an image feature amount from acquired photographed image data, and determining the kind of the object of the photographed image data, based on the data stored in the object database;
detecting composition assisting information corresponding to the photographed image data from the composition database, based on the determined kind of the object and the data stored in the composition database;
extracting characteristic information regarding each image from the photographed image data and sample image data related to the detected composition assisting information, and which determining a presentation priority in which the detected composition assisting information is presented to a user, based on characteristic information differences; and
displaying, on the display, the composition assisting information based on the determined priority;
wherein the priority is increased in accordance with an increase in the difference among the characteristic information.

18. A composition assisting method comprising:
acquiring photographed image data;
extracting an image feature amount from the photographed image data;

detecting a kind of an object corresponding to the extracted image feature amount from an object database storing data in which the image feature amount extracted from the image data is associated with the kind of the object corresponding to the image feature amount, for each of a plurality of objects;

searching for composition assisting information corresponding to the detected kind of the object from a composition database storing data in which the kind of the object and composition assisting information corresponding to the kind of the object are associated with each other;

extracting characteristic information regarding each image data from the photographed image data and sample image data related to the composition assisting information searched for by the searching, and determining a presentation priority in which the composition assisting information searched for by the searching are presented to a user, based on characteristic information differences; and displaying the composition assisting information based on the determined priority;

wherein the priority is increased in accordance with an increase in the difference among the characteristic information.

19. A non-transitory storage medium storing a composition assisting program for causing a computer to realize functions comprising:

extracting an image feature amount from photographed image data;

detecting a kind of an object corresponding to the extracted image feature amount from an object database storing data in which the image feature amount extracted from the image data is associated with the kind of the object corresponding to the image feature amount, for each of a plurality of objects;

searching for composition assisting information corresponding to the detected kind of the object from a composition database storing data in which the kind of the object and composition assisting information corresponding to the kind of the object are associated with each other;

extracting characteristic information regarding each image data from the photographed image data and sample image data related to the composition assisting information searched for by the searching, and determining presentation priority in which the composition assisting information searched for by the searching are presented to a user, based on characteristic information differences; and displaying the composition assisting information based on the determined priority;

wherein the priority is increased in accordance with an increase in the difference among the characteristic information.

* * * * *